(12) United States Patent
Yu

(10) Patent No.: US 7,098,634 B1
(45) Date of Patent: Aug. 29, 2006

(54) BUCK-BOOST CIRCUIT WITH NORMALLY OFF JFET

(75) Inventor: Ho-Yuan Yu, Saratoga, CA (US)

(73) Assignee: Lovoltech, Inc., Santa Clara, CA (US)

( * ) Notice: Subject to any disclaimer, the term of this patent is extended or adjusted under 35 U.S.C. 154(b) by 162 days.

(21) Appl. No.: 10/371,856

(22) Filed: Feb. 21, 2003

(51) Int. Cl.
*G05F 1/613* (2006.01)

(52) U.S. Cl. .................................................. 323/224
(58) Field of Classification Search ............... 323/224, 323/282, 222, 901
See application file for complete search history.

(56) References Cited

U.S. PATENT DOCUMENTS

| | | | | |
|---|---|---|---|---|
| 4,347,474 | A | * 8/1982 | Brooks et al. | 323/224 |
| 4,808,853 | A | 2/1989 | Taylor | 307/473 |
| 4,853,561 | A | 8/1989 | Gravok | 307/443 |
| 5,055,723 | A | 10/1991 | Bowers et al. | 307/581 |
| 5,180,964 | A | 1/1993 | Ewing | 323/222 |
| 5,359,280 | A | * 10/1994 | Canter et al. | 323/282 |
| 6,251,716 | B1 | 6/2001 | Yu | 438/186 |
| 6,356,059 | B1 | * 3/2002 | Yu | 323/223 |
| 6,580,252 | B1 | * 6/2003 | Yu | 323/222 |
| 6,696,706 | B1 | * 2/2004 | Pegler | 257/135 |

OTHER PUBLICATIONS

H. Ogiwara, M. Hayakawa, T. Nishimura and M. Nakaoka; "High–Frequency Induction Heating Inverter with Multi-–Resonant Mode Using Newly Developed Normally–Off Type Static Induction Transistors"; Department of Electrical Engineering, Ashikaga Institute of Technology, Japan; Department of Electrical Engineering, Oita University, Japan; Department of Electrical of Engineering, Kobe University, Japan; pp. 1017–1023; This paper appears in: Power Electronics Specialists Conference, 1993, PESC 93 record, 24$^{th}$ Annual IEEE, pp. 1017–1023, Jun. 20–24, 1993.

J. Baliga; "High–Voltage Junction–Gate Field Effect Transistor with Recessed Gates"; IEEE Transactions on Electron Devices; vol. ED–29; No. 10; Oct. 1982, no page #'s.

J. M. C. Stork et al.; "Small Geometry Depleted Base Bipolar Transistors (BSIT)–VLSI Devices?"; IEEE Transactions on Electron Devices; vol. ED–28; No. 11; Nov. 1981, no page #'s.

Nishizawa et al.; "Analysis of Static Characteristics of a Bipolar–Mode SIT (BSIT)"; IEEE Transactions on Electron Devices; vol ED–29; No. 11; Aug. 1982, 1233–1244.

Caruso et al.; "Performance Analysis of a Bipolar Mode FET (BMFET) with Normally Off Characteristics"; IEEE Transactions on Powe Electronics; vol. 3, No. 2; Apr. 1988, 3–4, 157–163.

Nishizawa et al.; "Field Effect Transistor Versus Analog Transistor (Static Induction Transistor)"; IEEE Transactions on Electron Devices; vol. ED–24; No. 4; Apr. 1975, no page #'s.

* cited by examiner

*Primary Examiner*—Shawn Riley
(74) *Attorney, Agent, or Firm*—Wagner, Murabito & Hao LLP

(57) ABSTRACT

An enhancement mode JFET as a switching device in a buck-boost converter circuit combined with a single rectifier diode and an inductor. A control circuit coupled to the gate of the JFET switches the JFET between a current conducting state and a current blocking state. The ratio of converter output voltage to converter input voltage is determined by the ratio of JFET current blocking time to the sum of JFET conduction time and JFET blocking time. This pulse width modulation scheme is thus used to adjust the dc output voltage level.

24 Claims, 6 Drawing Sheets

BUCK-BOOST CIRCUIT WITH NORMALLY OFF JFET

The following copending U.S. patent application Ser. No. 09/430,500, "NOVEL JFET STRUCTURE AND MANUFACTURE METHOD FOR LOW ON RESISTANCE AND LOW VOLTAGE APPLICATIONS", Ho-Yuan Yu, filed 29 Oct. 1999, is incorporated herein by reference for all purposes. The following U.S. provisional patent application Ser. No. 60/167,959, "STARTER DEVICE FOR NORMALLY "OFF" JFETS", Ho-Yuan Yu, filed 29 Nov. 1999, is incorporated herein by reference for all purposes.

BACKGROUND OF THE INVENTION

Related Applications

FIELD OF THE INVENTION

The present invention relates to the field of direct current (dc) power supplies designed for converting a given dc voltage to another dc voltage or dc current. More particularly, the present invention relates to utilization of enhancement mode Junction Field Effect Transistor (JFET) to construct dc-dD converters commonly known as buck-boost converters.

RELATED ART

Modem electronic circuit applications frequently require dc power supplied at several different voltage levels. It is often desirable to produce multiple dc voltage levels from a single dc voltage source by means of electronic circuits. This is particularly true in portable equipment where batteries are utilized either as the primary source of electrical energy or as the backup power source. Laptop computers, Personal Digital Assistants (PDA), pagers and cell phones all have such requirements. In a class of electronic circuits known as dc-dc converters, electric energy is transferred between two dc circuits operating at different voltage and current levels. Included in these circuits are the buck converter, the boost converter, and the buck-boost converter.

The buck-boost converter is a direct switching circuit for converting input dc voltage or current to output dc voltage. The buck-boost converter is used in a wide range of circuit applications including switching power supplies. The output voltage of the bucket converter can be less than, equal to, or greater than the input or source voltage. The basic circuit is a two-port network having a pair of input terminals and a pair of output terminals. The single dc power source is connected across the two input terminals and a dc load is connected across the two output terminals. Within the two-port, the ideal circuit consist of two switching devices, appropriate control circuitry for the two switching devices, and a single inductor. A capacitor is frequently placed across the output terminals to smooth the dc output voltage.

An ideal switching device has an on state and an off state. In the on state, a device conducts an electric current between two terminals with zero voltage drop across the terminals. In the off state, a device will support any voltage drop across two terminals while conducting zero current between the two terminals. A number of different electronic devices are used as switches in buck-boost converters, all of which depart from the ideal in one or more respects. Some examples of such devices include semiconductor diodes, bipolar junction transistors (BJT), field effect transistors (FET), and silicon controlled rectifiers (SCR).

One major concern with conventional switching devices is the non-zero voltage between the two current conducting terminals while in the on state. The result is power dissipation in the switching device with excessive heat generation and a reduction in overall circuit efficiency. The actual ratio of output voltage to input voltage is also limited by any significant voltage drop between the two current conducting terminals. A second major concern stems from the dynamic behavior of the switching devices. That is, the speed with which a device will transition between the on and the off states. Limits on both frequency of operation and duty cycle result from slow switching speeds. Every time a device switches between states, a certain amount of energy is lost, the slower the device switching time, the greater the power loss in the circuit. The effects become very important in high frequency (fast switching) and/or high power circuits where as much as 50% of the losses are due to excessive switching transition time.

SUMMARY OF THE INVENTION

Accordingly, what is needed is a switching device useful in dc power supply circuits that will approach the operation of an ideal switching device. What is further needed is a switching device that has close to zero volts across its conduction terminals while in the on or current conducting state. What is also needed is a switching device that is capable of operating in switching power supplies at higher operating frequencies by virtue of very short transition times between states. What is needed yet is a switching device having very low terminal voltage in the on state and very short transition times between states that can be used in high power circuits. The present invention provides these advantages and others not specifically mentioned above but described in the sections to follow.

An enhancement mode JFET as a switching device in a buck-boost converter circuit combined with a single rectifier diode and an inductor. A control circuit coupled to the gate of the JFET switches the JFET between a current conducting state and a current blocking state. The JFET duty cycle is defined as the ratio of current conducting time to the sum of current conducting time and current blocking time. The ratio of converter output voltage to converter input voltage is determined as the JFET duty cycle divided by the quantity one subtracted from the JFET duty cycle. This pulse width modulation scheme is thus used to adjust the dc output voltage level. Limits on both frequency of operation and duty cycle result from slow switching speeds. Each time a device switches between states, a certain amount of energy is lost. The slower the device switching time, the greater the power loss in the circuit. The effects become very important in high frequency (fast switching) and/or high power circuits where as much as 50% of the losses are due to excessive switch transition time. The enhancement mode JFET is an excellent switch since it has a very small internal resistance between source and drain in the conducting state as well as a very small terminal voltage. As a result, very little power is dissipated in the JFET itself. Furthermore, the current carriers in the JFET are all majority carriers which results in very short switching transition times. As a result, the present invention offers significant improvements over existing circuits in high frequency switching as well as high power applications.

In one embodiment of the present invention, a buck-boost converter using a normally off JFET is constructed in the form of a two-port network. The negative input terminal is electrically connected to the negative output terminal to form a common ground. A dc power source is connected across the terminals of the input port. A normally off, or enhancement mode, n-channel JFET is used as a switching device with source connected to the positive input terminal and drain connected to an internal common node. Control circuitry within the two-port applies a switching control signal to the gate of the JFET. The internal circuit consists of a semiconductor diode, an inductor and a capacitor. The anode of the diode is connected to the positive output terminal and the cathode is connected to the internal common node. The inductor is connected between the internal common node and the common ground. The capacitor is connected across the output terminals. The JFET has very low terminal voltage source to drain when in the on or conducting state. That is to say, the JFET has a very small internal resistance between source and drain in the on state. The current carriers in the JFET are all majority carriers which results in very short switching transition times. As a result, this circuit offers significant improvements over existing circuits in high frequency switching as well as high power applications.

In a second embodiment, an n-channel enhancement mode and a p-channel enhancement mode JFET are used as switching devices in a buck-boost converter circuit. The circuit topology is the same as the first configuration with the diode replaced by the p-channel JFET. The p-channel JFET is connected with source to the positive output terminal and drain to the internal common node. The gates of the two JFETs are connected together, and a switching signal is applied to the gates by means of an internal control circuit. The switching signal alternately holds one JFET in the conducting state while the other JFET is simultaneously held in the current blocking state, and then switches each JFET to the opposite state. Both JFETs have a very low terminal voltage source to drain when in the on or conducting state. That is to say, each JFET has a very small internal resistance between source and drain in the on state. The current carriers in the JFETs are all majority carriers which results in very short switching transition times. As a result, this circuit also offers significant improvements over existing circuits in high frequency switching as well as high power applications.

For both the first and second configurations, the internal switching control circuitry can be realized with simple current control to vary both frequency and duty cycle. Furthermore, high frequency applications can be accomplished without the need for complex zero voltage switching, zero current switching or synchronous rectifying circuitry.

DETAILED DESCRIPTION OF THE INVENTION

In the following detailed description of the present invention, a buck-boost circuit with normally off JFET, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

Figure 1:
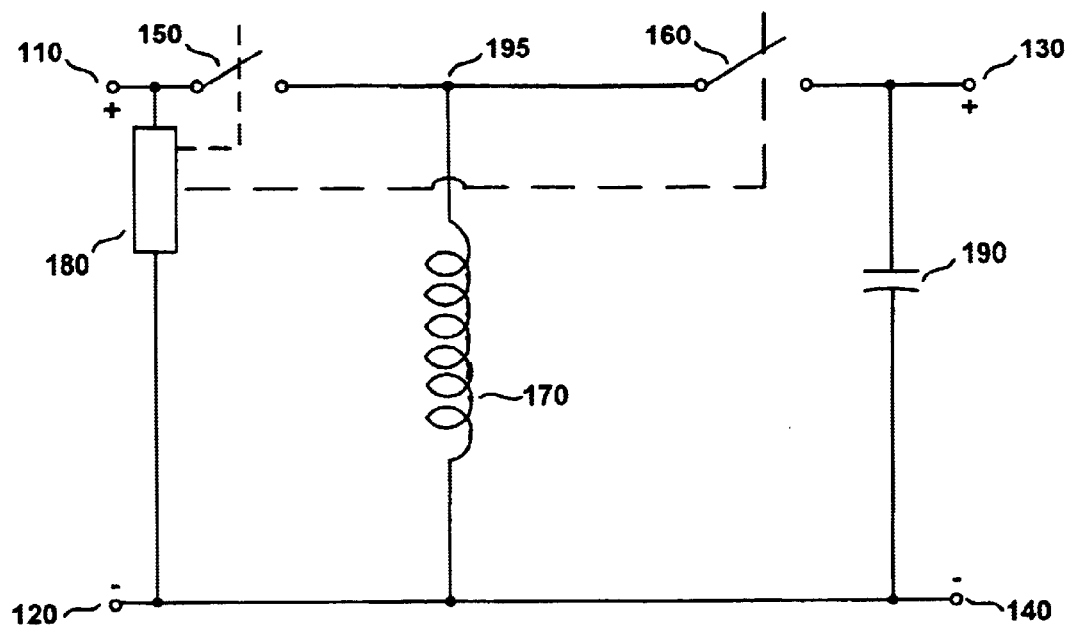
FIG. 1 is a generic diagram of a dc-dc buck-boost converter circuit.

The generic diagram for a dc-dc buck-boost converter circuit 100 is shown in FIG. 1 as a two-port network having a positive input terminal 110, a positive output terminal 130, and a negative input terminal 120 connected to a negative output terminal 140. A capacitor 190 placed across the output terminals filters the dc output voltage and also acts as an electrical load. A first switch 150 is connected between the positive input and an internal node 195. A second switch 160 is connected between the internal node and the positive output terminal. Both switches are operated by a control circuit 180 such that one switch is always open. A single inductor 170 is connected between the common negative terminals and the internal node. The circuit has two operating states according to the positions of the two switches. The control circuit continually switches the circuit back and forth between the two states. In the first state, switch 150 is closed while switch 160 is open. In this state, a dc current is established in the inductor which then acts as an energy storage element. In the second state, switch 150 is open while switch 160 is closed. In this state, the inductor acting as a current source tends to maintain the dc current though the load. By these means, a dc voltage applied at the input terminals will result in a dc voltage across the output terminals that is negative with respect to the input voltage. In principle, the output voltage can have a magnitude between zero and infinity. The magnitude of the dc output voltage can be controlled by the duty cycle of switch 150 which is defined as the ratio of closed time to the sum of closed time plus open time. With switch 150 held open and switch 160 held closed, the dc output voltage will be zero. With both switches alternately closed and open for equal time periods, the dc output voltage will be negative with respect to, and will have a magnitude equal to the dc input voltage. In general, the ratio of converter output voltage to converter input voltage is determined as the duty cycle of switch 150 divided by the quantity one subtracted from the reciprocal of the duty cycle of switch 150.

Figure 2:
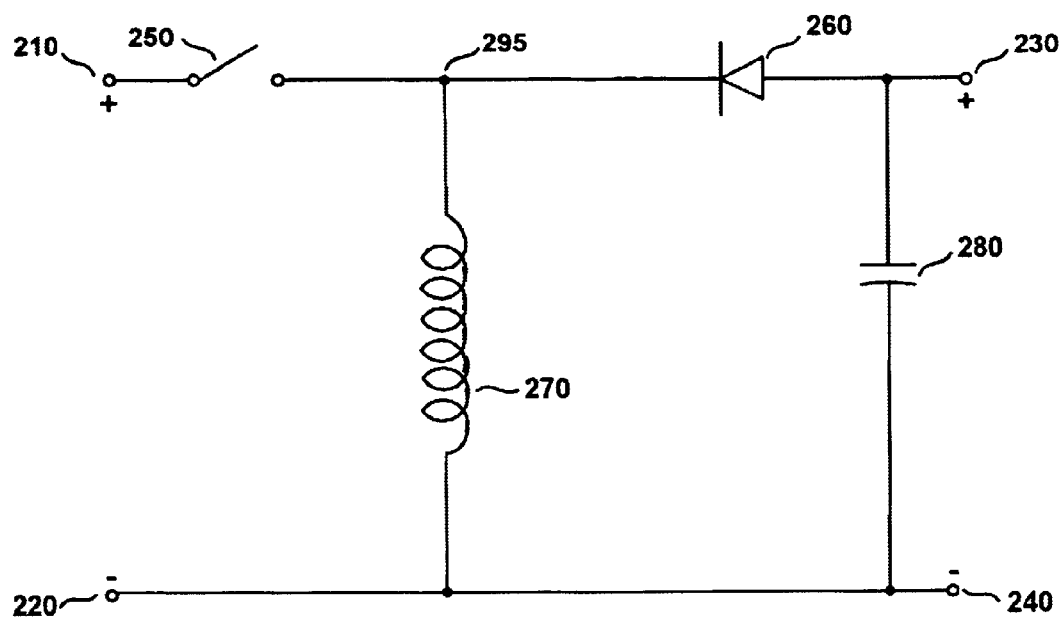
FIG. 2 is the generalized topology for a dc-dc buck-boost converter circuit using a single switch and a rectifier diode.

FIG. 2 is the generalized topology for a dc-dc buck-boost converter circuit 200 using a single switch 250 and a rectifier diode 260. The circuit is shown as a two-port network having a positive input terminal 210, a positive output terminal 230, and a negative input terminal 220 connected to a negative output terminal 240. The diode is connected with anode to the positive output terminal and cathode to an internal node 295. The switch is connected between the positive input terminal and the cathode of the diode. An inductor 270 is connected between the common negative terminals and the cathode of the diode. A capacitor 280 acts as an electrical load and a dc filter placed across the output terminals. This circuit has two operating states according to whether the switch is open or closed. In the first state, the switch is closed and a dc current is established in the inductor which then acts as an energy storage element. When the switch is closed, the diode is reverse biased and thus acts to block any current through it. In the second state, the switch is open and the inductor acting as a current source tends to maintain the dc current through the load. In this state, the diode is forward biased and thus acts as a closed switch to conduct current. By these means, a dc voltage applied at the input terminals will result in a dc voltage across the output terminals that is negative with respect to the input voltage.

The actual value of the dc output voltage can be controlled by the duty cycle of the switch which is defined as the ratio of closed time to the sum of closed time plus open time. In general, the ratio of converter output voltage to converter input voltage is determined as the duty cycle divided by the quantity one subtracted from the duty cycle. With the switch alternately closed and open with a duty cycle of one half, the dc output voltage will be negative with respect to the input voltage and will have an amplitude equal to the input voltage. Switch duty cycles smaller than one half will result in output voltage amplitudes smaller than the input voltage. Conversely, duty cycles greater than one half will result in output voltage amplitudes greater than the input voltage.

Figure 3:
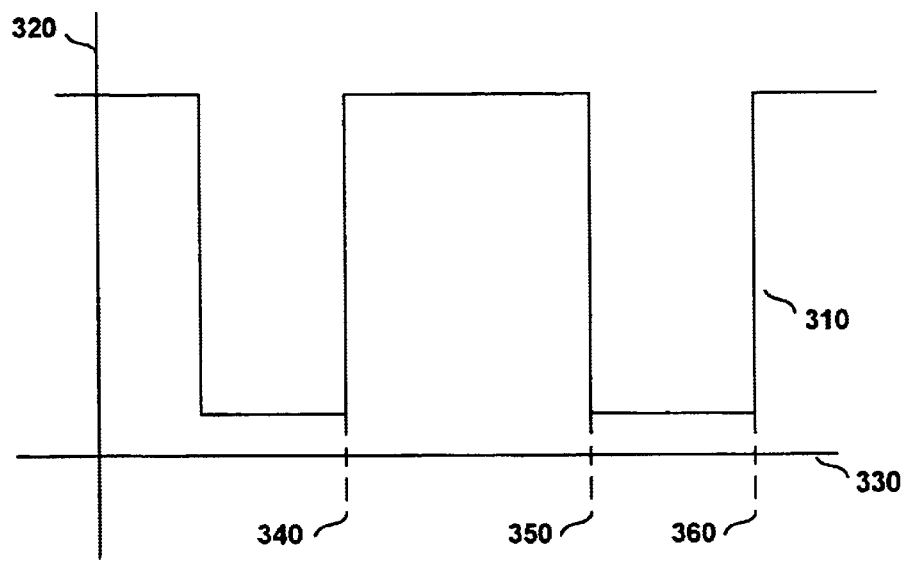
FIG. 3 is an exemplary pulse width modulated control waveform for holding switches in a current conducting state or in a current blocking state.

FIG. 3 is an exemplary pulse width modulated control waveform 300 for holding a switch in a current conducting state or in a current blocking state. The vertical scale 320 may be either a current or a voltage, and the horizontal scale 330 is in units of time. The waveform 310 is periodic with time period measured from point 340 to point 360. The high waveform level is measured from point 340 to point 350, while the low waveform level is measured from point 350 to point 360. The waveform can be considered a series of positive pulses, each positive pulse being measured from point 340 to point 350.

Alternately, the waveform can be considered a series of negative pulses, each negative pulse being measured from point 350 to point 360. Either the positive pulse or the negative pulse can be used to change the state of a switch between a current conducting state or a current blocking state according to the characteristics of the switch. The dc component of the waveform is proportional to pulse width which in turn is proportional to the dc output voltage level. That is the ratio of positive pulse time to time period of the ratio of negative pulse time to time period is proportional to the dc output voltage level. Thus, modulating the pulse width is a means for controlling the dc output voltage level. Reducing the width of the negative pulses to zero will produce a waveform held at the high level which will result in an output voltage that is zero. Reducing the width of the positive pulses to zero will produce a waveform held at the low level which will also result in an output voltage that is zero.

Figure 4:
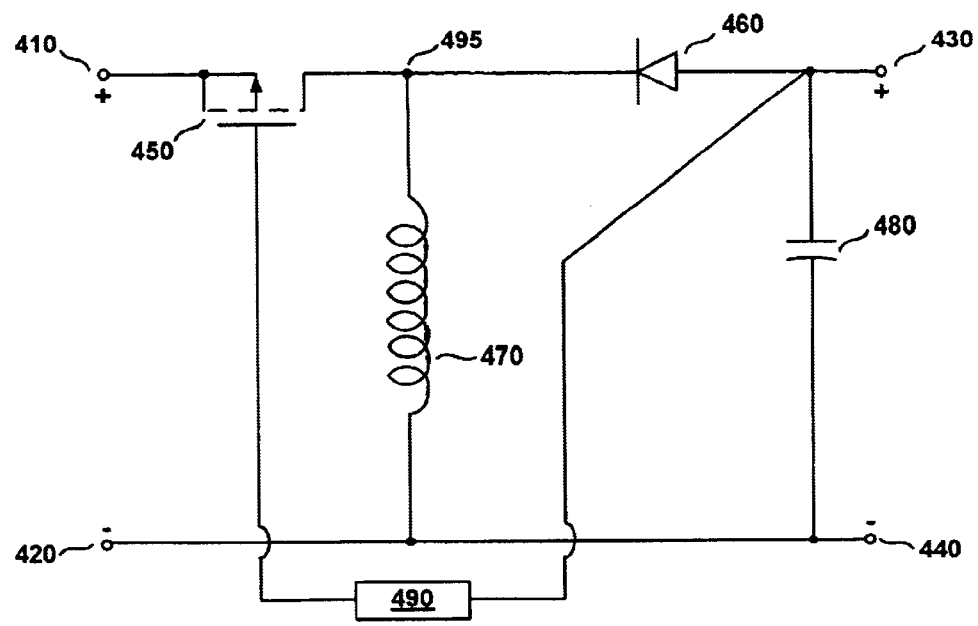
FIG. 4 is a circuit diagram for a prior art dc-dc buck-boost converter using a single MOSFET.

FIG. 4 is a circuit diagram 400 for a prior art dc-dc buck-boost converter using a single MOSFET 450 as a switch and a rectifier diode 460. The circuit is shown as a two-port network having a positive input terminal 410, a positive output terminal 430, and negative input terminal 420 connected to a negative output terminal 440. The MOSFET source is connected to the positive input terminal and its drain is connected to an internal node 495. The anode of the diode is connected to the positive output terminal and its cathode is connected to the drain of the MOSFET. An inductor 470 is connected between the common negative terminals and the cathode of the diode. A capacitor 480 acts as an electrical load placed across the output terminals. A control circuit 490 is coupled to the gate lead of the MOSFET for switching between current conducting and current blocking states. The control circuit is operated as a pulse width modulator and thus controls the level of the inverted dc output voltage.

Figure 5:
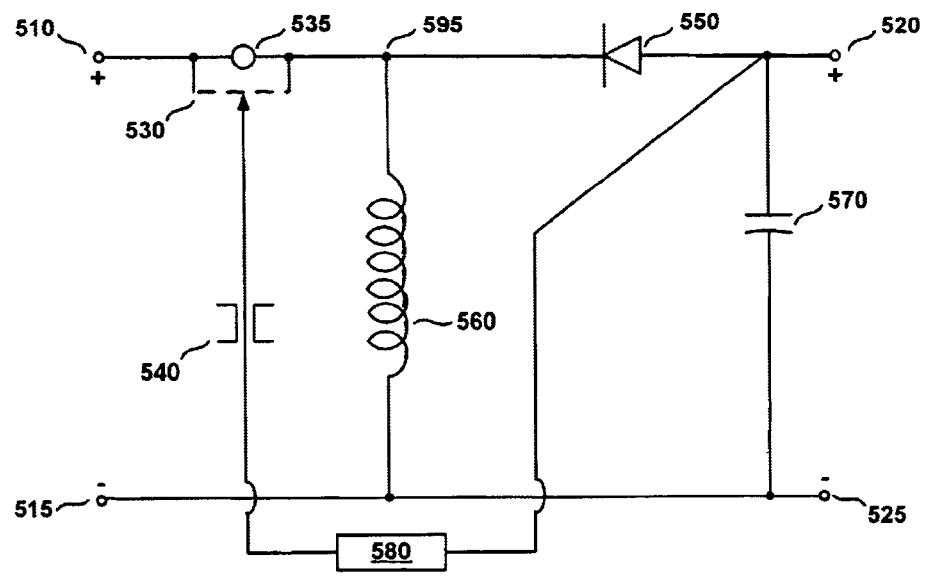
FIG. 5 is a circuit diagram for a dc-dc buck-boost converter using a single n-channel enhancement mode JFET according to the present invention.

FIG. 5 is a circuit diagram 500 for a dc-dc buck-booster converter using a single n-channel enhancement mode JFET 530, as described in copending U.S. provisional patent application Serial No. 60/167,959, "STARTER DEVICE FOR NORMALLY "OFF" JFETS", Ho-Yuan Yu, filed 29 Nov. 1999, as a switch and a rectifier diode 550 according to the present invention. The circuit is shown as a two-port network having a positive input terminal 510, a positive output terminal 520, and a negative input terminal 515 connected to a negative output terminal 525. The source and drain of the JFET are connected between the positive input terminal and an internal node 595. The anode of the diode is connected to the positive output terminal and the cathode is connected to the internal node. An inductor 560 is connected between the common negative terminals and the cathode of the diode. A capacitor 570 acts as an electrical load placed across the output terminals. A starter device 535 is connected between source and drain of the JFET. A control circuit 580 is coupled to the gate lead of the JFET for alternately switching between current conducting and current blocking states. A current limiting device 540 can be connected in series between the control circuit and the gate lead of the JFET for gate protection.

With the JFET in a current conducting state, a voltage source connected across the input terminals causes a dc current in a path entering the positive input terminal, passing through the JFET and the inductor and out the negative input terminal returning to the voltage source, thereby storing energy in the inductor. With the JFET in the current blocking state, the energy stored in the inductor causes a dc current in a path through the inductor entering the capacitor and out the negative output terms through a load, into the positive output terminal and through the rectifier diode back to the inductor. The control waveform applied to the gate lead of the JFET can be considered a series of positive pulses in which a positive pulse switches the JFET into a current conducting state.

The control circuit is operated as a pulse width modulator and thus controls the amplitude of the dc output voltage which is negative with respect to the input source voltage. The JFET duty cycle is defined as the ratio of JFET current conducting time to the sum of JFET current blocking time plus JFET current conducting time. The ratio of output source voltage to input voltage is then proportional to the duty cycle of the JFET divided by one subtracted from the duty cycle of the JFET. Holding the waveform in the low state holds the JFET in a current blocking state which results in a zero dc output voltage. It is to be appreciated that a similar dc-dc buck-boost converter circuit is realizable using a p-channel enhancement mode JFET with the approriate control waveform.

Figure 6:
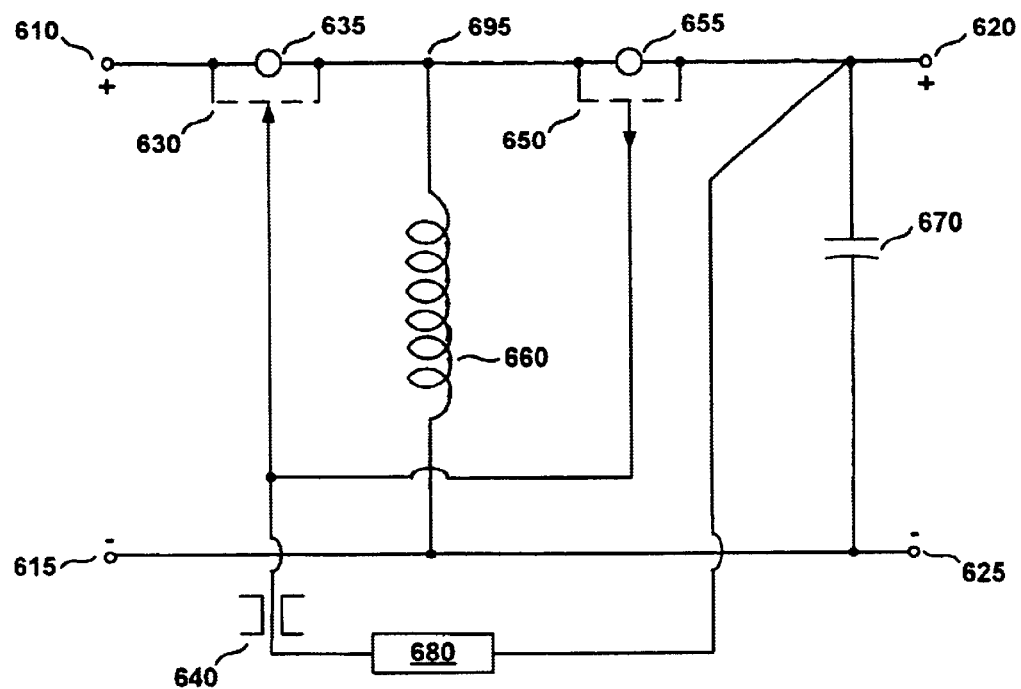
FIG. 6 is a circuit diagram for a dc-dc buck-boost converter using a single n-channel enhancement mode JFET and a single p-channel enhancement mode JFET according to the present invention.

FIG. 6 is a circuit diagram 600 for a dc-dc buck-boost converter using an n-channel enhancement mode JFET 630 as a first switch and a p-channel enhancement mode JFET 650 as a second switch according to the present invention. The circuit is shown as a two-port network having a positive input terminal 610, a positive output terminal 620, and a negative input terminal 615 connected to a negative output terminal 625. An inductor 660 is connected between the common negative terminals and an internal node 695. A capacitor 670 acts as an electrical load placed across the output terminals. The n-channel JFET source and drain are connected between the positive input terminal and the internal node. The p-channel JFET source and drain are connected between the positive output terminal and the internal node.

Starter devices 635 and 655 can be connected between source and drain of the n-channel JFET and the p-channel JFET respectively. A control circuit 680 is coupled to the gate leads of both JFETs for alternately switching them between current conducting and current blocking states. A current limiting device 640 can be connected in series between the control circuit and the gate leads of the JFETs for gate protection. When the n-channel JFET is in a current conducting state, the p-channel JFET will be held in a current blocking state. Under this condition, a voltage source connected across the input terminals causes a dc current in a path entering the positive input terminal, passing through the n-channel JFET and the inductor, and out the negative input terminal returning to the voltage source, thereby storing energy in the inductor.

When the n-channel JFET is in the current blocking state, the p-channel JFET will be held in a current conducting state. Under this condition, the energy stored in the inductor causes a dc current in a path through the inductor entering the capacitor and out the negative output terminal through a load, into the positive output terminal and through the p-channel JFET back to the inductor. The control circuit is operated as a pulse width modulator and thus controls the amplitude of the dc output voltage which is negative with respect to the input source voltage. The control waveform applied to the gate leads of the JFETs can be considered a series of positive pulses in which a positive pulse switches the n-channel JFET into the current conducting state, and simultaneously switches the p-channel JFET into the current blocking state.

The duty cycle of the p-channel JFET is defined as the ratio of p-channel current conducting time to the sum of p-channel current conducting time plus p-channel current blocking time. Similarly, the duty cycle of the n-channel JFET is defined as the ratio of n-channel current conducting time to the sum of n-channel current conducting time plus n-channel current blocking time. The ratio of output voltage to input source voltage is then the negative of the ratio given by the duty cycle of the n-channel JFET divided by the duty cycle of the p-channel JFET.

Thus for equal duty cycles, the magnitude of the output voltage is equal to the input voltage. For n-channel JFET duty cycles smaller than one half, the magnitude of the output voltage is smaller than the input voltage. For n-channel duty cycles greater than one half the magnitude of the output voltage is greater than the input voltage. Holding the waveform in the low state holds the n-channel JFET in a current blocking state which results in a zero dc output voltage. It is to be appreciated that a similar dc-dc boost converter circuit is realizable by interchanging the positions of the n-channel and p-channel JFETs with the appropriate control waveform.

The preferred embodiment of the present invention, a buck-boost converter with normally off JFET, is thus described. While the present invention has been described in particular embodiments, it should be appreciated that the present invention should not be construed as limited by such embodiments, but rather construed according to the below claims.

What is claimed is:

1. A buck-boost converter circuit comprising:
   a) at least one enhancement mode JFET coupled to the input;
   b) an inductor coupled to said JFET;
   c) a current rectifying device coupled to the output;
   d) a control circuit; and
   e) a current limiting device connected in series between said a gate lead of said JFET and said control circuit.

2. A buck-boost circuit according to claim 1 wherein said control circuit is for switching said JFET between a current blocking state and a current conducting state.

3. A buck-boost circuit according to claim 1 wherein said control circuit is for determining the frequency at which said JFET is switched between a current blocking state and a current conducting state.

4. A buck-boost circuit according to claim 1 wherein the ratio of input voltage to output voltage is determined by the ratio of said JFET current blocking time to the sum of said JFET current conducting time and said JFET current blocking time.

5. A buck-boost converter circuit comprising:
   a) a two-port network comprising a positive input terminal; a positive output terminal, and a negative terminal common to the input and the output;
   b) an enhancement mode Junction Field Effect Transistor (JFET) coupled with the source and drain between said positive input terminal and an inductor;
   c) said inductor coupled between said JFET and said common negative terminals;
   d) a rectifier diode couple between said inductor and said JFET and said positive output terminals;
   e) a control circuit for switching said JFET; and
   a starter device connected between said source lead and said drain lead of said JFET.

6. A buck-boost converter circuit according to claim 5 wherein said JFET comprises an enhancement mode p-channel JFET.

7. A buck-boost converter circuit according to claim 5 wherein the gate of said JFET is coupled to said control circuit.

8. A buck-boost converter circuit according to claim 5 wherein said control circuit is for switching said JFET between a current blocking state and a current conducting state.

9. A buck-boost converter circuit according to claim 5 wherein said control circuit is for determining the frequency at which said JFET is switched between a current blocking state and a current conducting state.

10. A buck-boost converter circuit according to claim 5 further comprising a capacitor connected between said positive output terminal and said negative output terminal.

11. A buck-boost converter circuit according to claim 5 further comprising a current limiting device connected in series between said gate lead of said JFET and said control circuit.

12. A buck-boost circuit comprising:
   a) a two-port network comprising a positive input terminal; a positive output terminal, and a negative terminal common to the input and the output;
   b) an enhancement mode n-channel Junction Field Effect Transistor (JFET) coupled with source and drain between said positive input terminal and an inductor;
   c) said inductor coupled between said n-channel JFET and said common negative terminal;
   d) an enhancement mode p-channel JFET coupled with source and drain between said n-channel JFET and said positive output terminal;
   e) a control circuit for switching said JFETS; and
   a current limiting device connected in series between said gate lead of said n-channel Junction Field Effect Transistor and said control circuit.

13. A buck-boost converter circuit according to claim 12 wherein said control circuit is for holding said n-channel JFET in a current blocking state while said p-channel JFET is held in a current conducting state.

14. A buck-boost converter circuit according to claim 12 wherein said control circuit is for holding said p-channel JFET in a current blocking state while said n-channel JFET is held in a current conducting state.

15. A buck-boost converter circuit according to claim 12 wherein said control circuit is for determining the frequency at which said n-channel JFET and said p-channel JFET are switched between a current blocking state and a current conducting state.

16. A buck-boost converter circuit according to claim 12 further comprising a capacitor connected between said positive output terminal and said negative output terminal.

17. A buck-boost converter circuit according to claim 12 wherein said n-channel JFET is replaced with a p-channel JFET and said p-channel JFET is replaced with a n-channel JFET.

18. A buck-boost converter circuit comprising:
   a) a two-port network comprising a positive input terminal; a positive output terminal, and a negative terminal common to the input and the output;
   b) an enhancement mode Junction Field Effect Transistor (JFET) couple with the source and drain between said positive input terminal and an inductor;
   c) said inductor coupled between said JFET and said common negative terminals;
   d) a rectifier diode couple between said inductor and said JFET and said positive output terminal;
   e) a control circuit for switching said JFET; and
   a current limiting device connected in series between said gate lead of said JFET and said control circuit.

19. A buck-boost converter circuit according to claim 18 wherein said JFET comprises an enhancement mode p-channel JFET.

20. A buck-boost converter circuit according to claim 18 wherein the gate of said JFET is coupled to said control circuit.

21. A buck-boost converter circuit according to claim 18 wherein said control circuit is for switching said JFET between a current blocking state and a current conducting state.

22. A buck-boost converter circuit according to claim 18 wherein said control circuit is for determining the frequency at which said JFET is switched between s current blocking state and a current conducting state.

23. A buck-boost converter circuit according to claim 18 further comprising a capacitor connected between said positive output terminal and said negative output terminal.

24. A buck-boost converter circuit according to claim 18 further comprising a starter device connected between said source lead and said drain lead of said JFET.

* * * * *